United States Patent [19]

Kurobe et al.

[11] Patent Number: 5,046,137
[45] Date of Patent: Sep. 3, 1991

[54] OPTICAL COMMUNICATION SYSTEM

[75] Inventors: Akio Kurobe, Moriguchi; Hiromasa Nakatsu, Osaka; Masao Ikezaki; Nobuo Sugino, both of Neyagawa; Yosihisa Mochida, Ikoma, all of Japan

[73] Assignee: Matsushita Electric Industrial Co., Ltd., Osaka, Japan

[21] Appl. No.: 469,065

[22] Filed: Jan. 23, 1990

[30] Foreign Application Priority Data

Jan. 27, 1989 [JP] Japan .................................. 1-017992

[51] Int. Cl.$^5$ ............................ G02F 1/00; H04J 1/00
[52] U.S. Cl. .................................. 359/136; 359/152; 359/164
[58] Field of Search ........................ 455/606, 616, 612; 370/4

[56] References Cited

U.S. PATENT DOCUMENTS 4,742,576 5/1988 McMahon ........................... 455/612
4,809,361 2/1989 Okada et al. ........................ 455/606

FOREIGN PATENT DOCUMENTS 0057835 4/1983 Japan .................................. 455/612

Primary Examiner—Joseph A. Orsino
Assistant Examiner—Franklin V. Nguyen
Attorney, Agent, or Firm—Stevens, Davis, Miller & Mosher

[57] ABSTRACT

An optical communication system is provided in which a digital data bus is used as a transmission line. Each terminal equipment measures an optical output level to enable the terminal equipment to receive a packet transmitted from the terminal equipment itself and informs other terminal equipments of the measured optical output level. Each terminal equipment establishes its optical output level to be the largest one of the levels informed thereto. Further, each terminal equipment measures the delay time of an acknowledge bit transmitted from the other terminal equipments to thereby shift the sampling point by the mean value of the measured delay time, so that bus connection of terminal equipments through optical fiber can be facilitated, channel access control based on CSMA/CD can be performed, and wiring between the terminal equipments can be conserved by performing multiple transmission of audio signals and video signals as well as digital data.

3 Claims, 7 Drawing Sheets

OPTICAL COMMUNICATION SYSTEM

BACKGROUND OF THE INVENTION

The present invention relates to an optical communication system for realizing a digital data bus for performing information communication between audio and video appliances.

FIG. 1 shows an example of a system construction of a digital data bus realized by electric communication using metallic wire as a transmission medium.

In FIG. 1, portions surrounded by broken lines designate terminal equipments which are connected to each other through metallic wire. In each terminal equipment, the reference numeral 3 designates a communication interface section for performing data communication according to a predetermined communication protocol. A driver circuit 1 and a receiver circuit 2 are connected to the communication interface section 3. The reference numerals 15 and 16 designate an input terminal and an output terminal respectively. The output terminal of each terminal equipment is connected to the input terminal of the succeeding terminal equipment through metallic wire successively to thereby constitute a bus-shaped transmission line. Because output signals from the respective terminal equipments can be simultaneously received by all of the terminal equipments through the bus-shaped transmission line, it is possible to perform channel access control based on surviving type CSMA/CD (Carrier Sense Multiple Access with Collision Detection). The reference numeral 17 designates terminal resistors which are provided on opposite ends of the bus for the purpose of impedance matching.

In the case of a digital data bus, wiring between terminal equipments becomes complex, because a data communication transmission medium must be newly provided in addition to a conventional medium for transmitting audio and video signals. Therefore, each terminal equipment may be constituted by a coupler for coupling a transmission signal with an up-load signal and a branch device for branching a reception signal from a down-load signal by use of optical fiber as a transmission medium to thereby facilitate multiple transmission of audio and video signals as well as digital data and conserving wiring between terminal equipments. However, a large insertion loss occurs in the branch device as well as in the coupler, so that the levels of signals between terminal equipments vary widely in the case of bus connection. Further, an increase in signal delay time is caused by an opto-electric converter section and an electro-optic converter section, so that there has been a limitation in transmission rate, in number of terminal equipments and in line length for realizing channel access control based on the surviving type CSMA/CD.

SUMMARY OF THE INVENTION

An object of the invention is to provide an optical communication system for realizing a digital data bus in which the aforementioned problems are solved.

To attain the foregoing object, according to the present invention, the light sending-out level in each terminal equipment is made variable and each terminal equipment measures a packet transmitted by the terminal equipment itself and informs the other terminal equipments of the result of the measurement so that each terminal equipment sets its sending-out level to the largest value of the sending-out levels of which the terminal equipment has been informed.

Further, each terminal equipment measures the delay time of an acknowledge bit transmitted from the other terminal equipments so that each terminal equipment shifts a sampling point by the mean value of the measured delay time.

According to the present invention, bus connection of terminal equipments through optical fiber can be facilitated, and at the same time, channel access control based on the surviving type CSMA/CD can be performed. Furthermore, multiple transmission of audio and video signals as well as digital data and conversation of wiring between terminal equipments can be attained.

BRIEF DESCRIPTION OF THE DRAWINGS

The above and other objects, features and advantages of the present invention will be apparent from the following description of the preferred embodiments of the invention taken in connection with the accompanying drawings, wherein.

DESCRIPTION OF THE PREFERRED EMBODIMENTS

(Embodiment 1)

Figure 1:
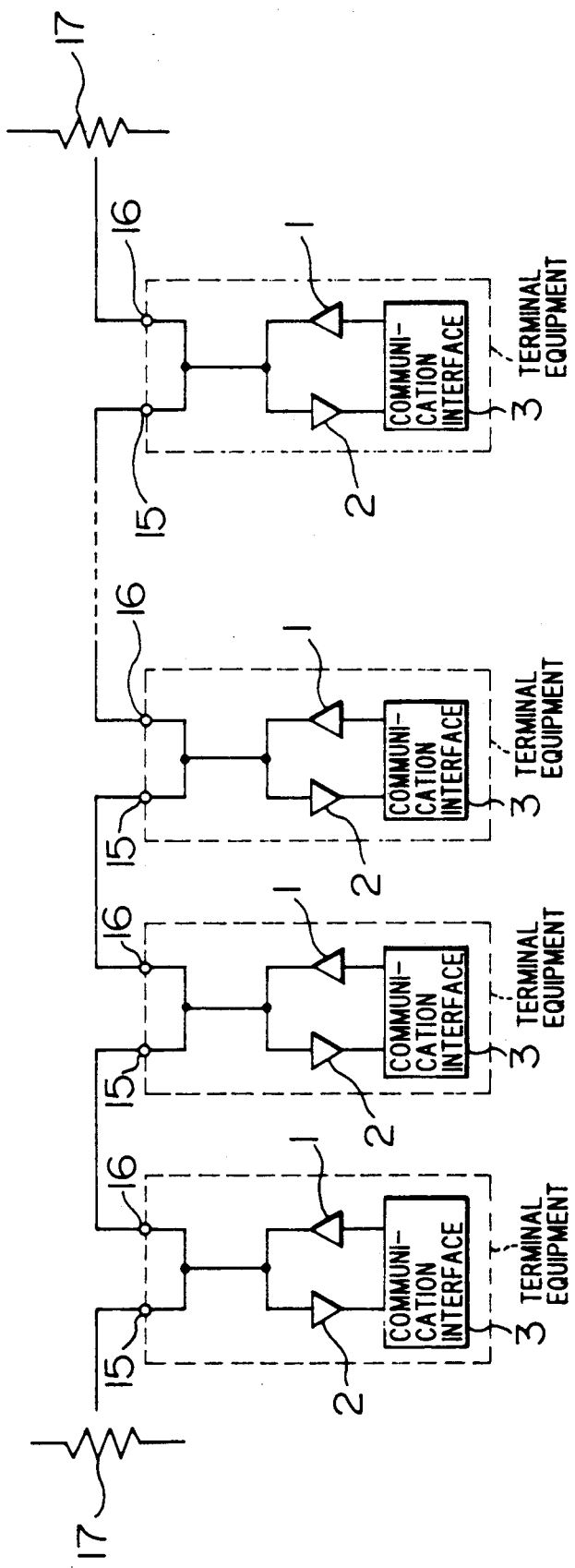
FIG. 1 is a configuration diagram of a conventional digital data bus.
Figure 2:
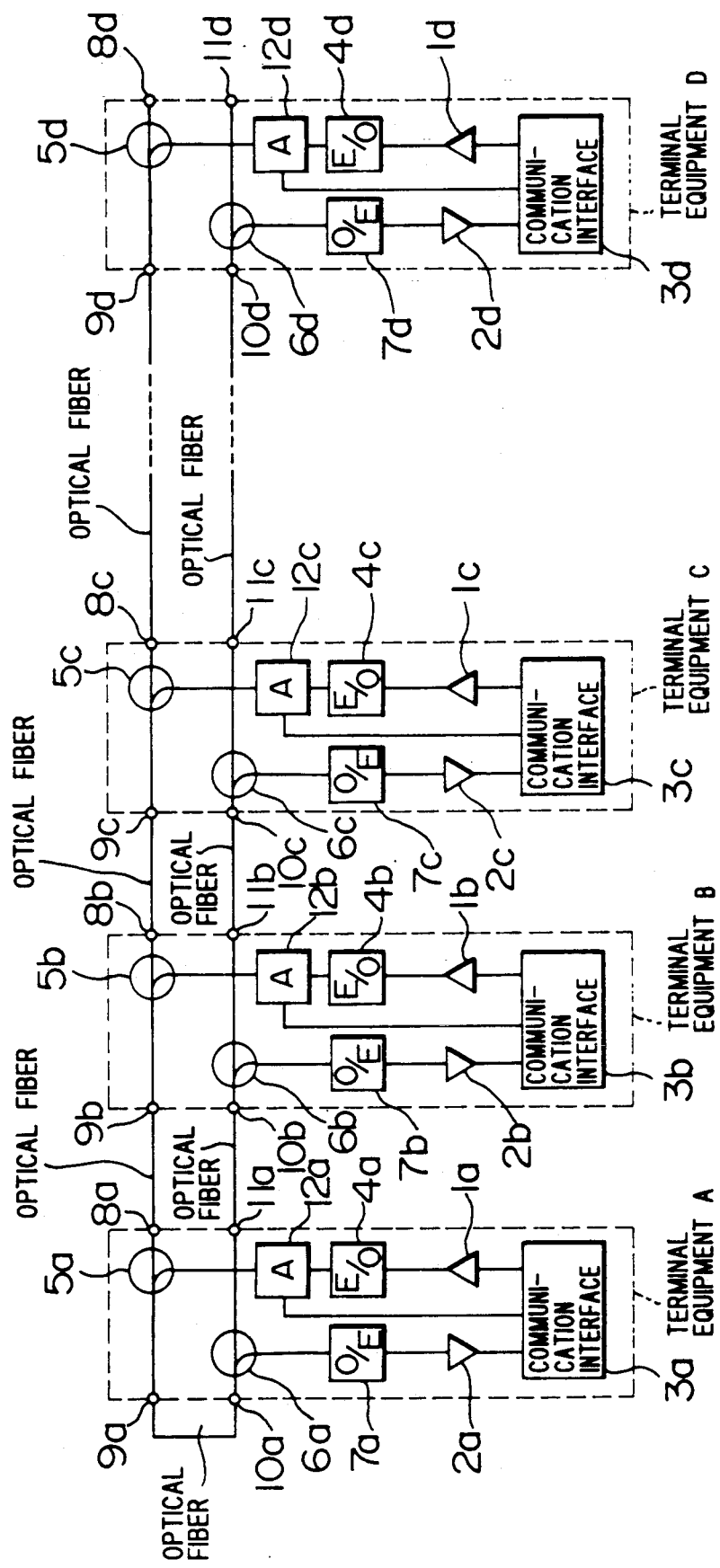
FIG. 2 is a configuration diagram showing a first embodiment of the present invention.

FIG. 2 is a diagram showing a first embodiment of the optical communication system according to the present invention. In FIG. 2, portions surrounded by broken lines designate terminal equipments. The terminal equipments A, B, ... , D are connected to each other through optical fiber. The terminal equipments A, B, ... , D correspondingly respectively include: driver circuits 1a, 1b, ... , 1d; receiver circuits 2a, 2b, ... , 2d; communication interface sections 3a, 3b, ... , 3d; electro-optic converter sections 4a, 4b, ... , 4d; first branch couplers 5a, 5b, ... , 5d; second branch couplers 6a, 6b, ... , 6d; opto-electric converter sections 7a, 7b, ... , 7d; up-load optical signal input terminals 8a, 8b, ... , 8d; up-load optical signal output terminals 9a, 9b, ... , 9d; down-load optical signal input terminals 10a, 10b, ... , 10d; down-load optical signal output terminals 11a, 11b, ... , 11d; and optical amplifiers 12a, 12b, ... , 12d in which the amplification factors can be set based on signals sent from the respective communication interface sections 3a, 3b, ... , 3d.

In the following, the construction of the invention is described more in detail. In each terminal equipment A (B, ... , D) the communication interface section 3a (3b, ... , 3d) operates together with the driver circuit 1a (1b, ..., 1d) and the receiver circuit 2a (2b, ..., 2d) to perform transmission/reception of an electric signal in accordance with a predetermined communication protocol. A transmission signal is converted into an optical signal by the electro-optic converter section 4a (4b, ..., 4d) and a received optical signal is converted into an electric signal by the opto-electric converter section 7a(7a, ..., 7d), the electric signal being led to the receiver circuit 2a(2b, ..., 2d). In each terminal equipment A (B, ..., D), the transmission signal is coupled with an up-load optical signal inputted from the up-load optical signal input terminal 8a (8b, ..., 8d) and then sent out from the up-load optical signal output terminal 9a (9b, ..., 9d). In FIG. 2, the up-load optical signal output terminal 9d of the terminal equipment D is connected to the up-load optical signal input terminal 8c of the terminal equipment C through optical fiber. The same applies to all the terminal equipments so that optical signals transmitted from all of the terminal equipments are sent out from the up-load optical signal output terminal 9a of the terminal equipment A located in the head position. The up-load optical signal output terminal 9a of the terminal equipment A is connected to the down-load optical signal input terminal 10a of the terminal equipment A through optical fiber, so that the signals transmitted from all of the terminal equipments are inputted to the down-load optical signal input terminal 10a as a down-load optical signal. In each terminal equipment A (B, ..., D), a signal inputted through the down-load optical signal input terminal 10a (10b, ..., 10d) is branched into two by the second branch coupler 6a (6b, ..., 6d) so that one of the branched signals is sent out from the down-load optical signal output terminal 11a (11b, ..., 11d) and the other is led to the receiver circuit 2a (2b, ..., 2d) after being converted into an electric signal by the opto-electric converter section 7a (7b, ..., 7d). In FIG. 2, the down-load optical signal output terminal 11a of the terminal equipment A is connected to the down-load optical signal input terminal 10b of the terminal equipment B through optical fiber. The same applies to all of the terminal equipments so that optical signals transmitted from all of the terminal equipments are led to the receiver circuit 2a (2b, ..., 2d) of each terminal equipment A (B, ..., D).

In the following, the operation of the system is described.

At the time of the starting of the system, each terminal equipment A (B, ..., D) transmits a packet addressed to itself. At this time, the gain of the optical amplifier 12a (12b, ..., 12d) is started from its minimum. When the transmitted packet cannot be received, the packet addressed to itself is transmitted again after the amplification factor of the optical amplifier 12a (12b, ..., 12d) is increased by one rank. The aforementioned operation is repeated until reception is enabled.

The signal sent out from the optical amplifier 12a (12b, ..., 12d) in each terminal equipment A (B, ..., D) is attenuated because of losses such as a branching loss, a coupling loss, an insertion loss, and a transmission loss of optical fiber, and then reaches to a reception point. For example, the signal sent out of the optical amplifier 12a of the terminal equipment A is passed through the branch couplers 5a and 6a. On the other hand, the signal sent out of the optical amplifier 12d of the terminal equipment D is passed through the branch couplers 5d, 5c, 5b, 5a, 6a, 6b, 6c and 6d. Accordingly, in FIG. 2, the amplification factor of the terminal equipment A may be set to be the smallest value and, on the other hand, the amplification factor of the terminal equipment D must be set to be the largest value. In short, data communications between all of the terminal equipments can be made without difficulty if the amplification factors of all the terminal equipments have the same value as the amplification factor of the terminal equipment D.

Then, each terminal equipment informs the other terminal equipments of its own amplification factor by means of a broadcast packet, and each terminal equipment sets the amplification factor of its own optical amplifier to be the largest value of the amplification factors received through the broadcast packet.

By the aforementioned configuration, data communication can be made with optimum light intensity corresponding to the scale of the system. Thus, a system excellent in extension, durability and power saving can be realized.

(Embodiment 2)

Figure 3:
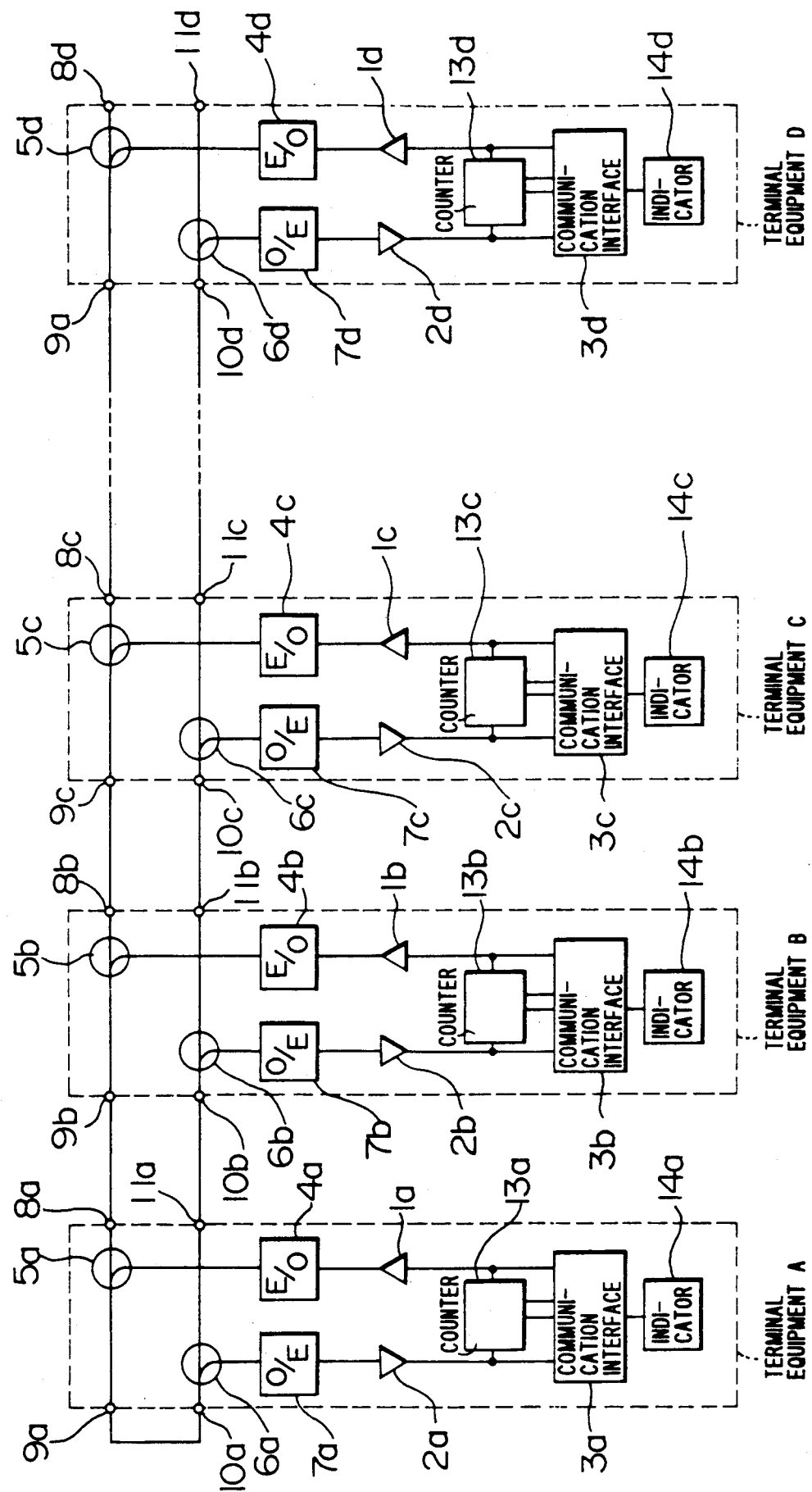
FIG. 3 is a configuration diagram showing a second embodiment of the present invention.

FIG. 3 shows a second embodiment of the optical communication system according to the present invention. In FIG. 3, the same constituent members as those in the first embodiment shown in FIG. 2 are referenced correspondingly. The reference numerals 13a, 13b, ..., 13d designate counting means for counting the time difference between the time when a signal is transmitted from the communication interface section 3a (3b, ..., 3d) to the driver circuit 1a (1a, ..., 1d) in the case of packet transmission and the time when an acknowledge bit reaches the communication interface section 3a (3b, ..., 3d) through the receiver circuit 2a (2b, ..., 2d), and for reporting the result of the counting to the communication interface section 3a, (3b, ..., 3d). The reference numerals 14a, 14b, ..., 14d designate indication means.

In the following, the operation of the system is described.

Figure 4:
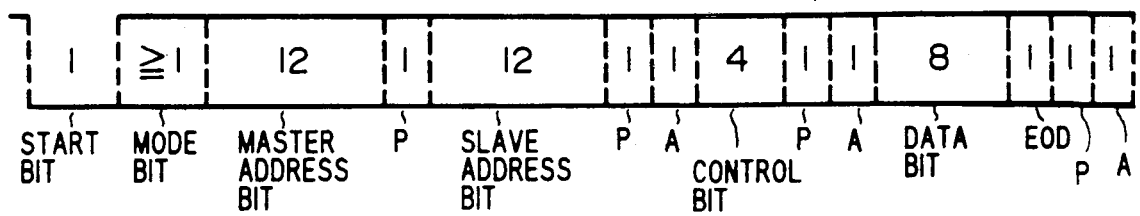
FIG. 4 is a diagram for explaining the packet format in a digital data bus.

FIG. 4 shows the data format in a digital data bus. In FIG. 4, the symbol P in the format represents a parity bit, A an acknowledge bit and EOD an end-of-data bit. The digital data bus is synchronized based on a start bit and then channel access control by CSMA/CD is performed based on mode and master address bits following the start bit. Consequently, one terminal equipment remaining undefeated acquires priority and transmits parity bits, slave address bits, control bits, data bits and an end-of-data bit as a master. An acknowledge bit is the bit for reporting the fact that a terminal equipment designated by the slave address bits has acknowledged information coming to the terminal equipment. The designated terminal equipment transmits with the passage of a predetermined time after the terminal equipment receives a bit synchronizing signal transmitted from the master in the early stage of the period of the respective acknowledge bit.

Figure 5:
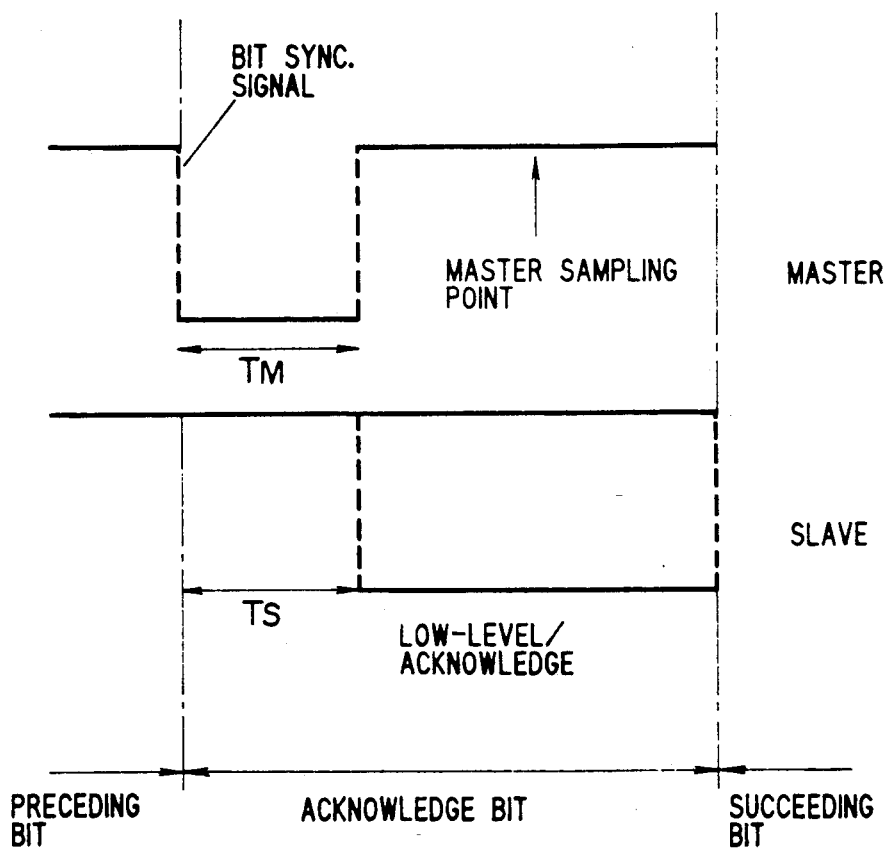
FIG. 5 is a diagram for explaining the bit format of an acknowledge bit in a digital data bus.

FIG. 5 shows the bit format of the acknowledge bit. Assuming now that the period of time $T_M$ from the point of time when the master transmits a bit synchronizing signal to the point of time when the master transmits a high-level signal again is equal to the period of time $T_S$ from the point of time when the slave receives the synchronizing signal to the point of time when the slave transmits an acknowledge bit, then the operation of the system is as shown in FIG. 6 in the case where the terminal equipment A as a master in FIG. 3 transmits a bit synchronizing signal and the terminal equipment D as a slave returns an acknowledge signal.

Figure 6:
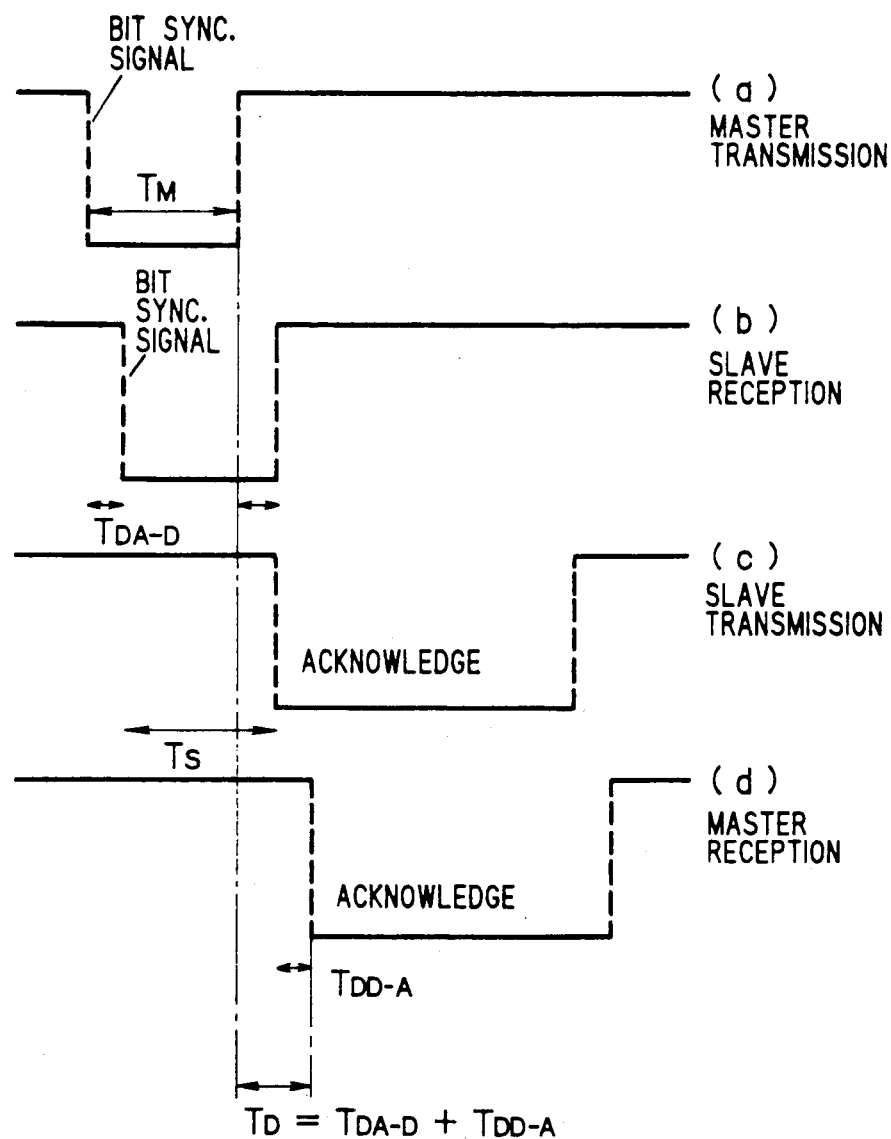
FIG. 6 is a diagram for explaining the case where an acknowledge bit is transmitted and received between terminal equipments.

In FIG. 6. the diagram (a) shows a bit synchronizing signal for the acknowledge bit transmitted by the terminal equipment A as a master, and the diagram (b) shows the state where the bit synchronizing signal of the diagram (a) reaches the output of the receiver circuit 2d of the terminal equipment D as a slave. The signal of the diagram (b) is delayed, compared with the signal of the diagram (a), for the sum $T_{DA-D}$ of the delay time in the driver circuit 1a and the electro-optic converter section 4a of the terminal equipment A, the delay time in the light transmission line leading from the output point of the electro-optic converter section 4a to the input of the opto-electric converter section 7d of the terminal equipment D and the delay time in the opto-electric converter section 7d and the receiver circuit 2d. In FIG. 6, the diagram (c) shows an acknowledge signal transmitted by the terminal equipment D with the passage of a predetermined time $T_S (=T_M)$ after the terminal equipment D receives the bit synchronizing signal. The acknowledge signal reaches the master in the form of an acknowledge signal shown in the diagram (d) after the signal is delayed for the sum $T_{DD-A}$ of the delay time in the driver circuit 1d and the electro-optic converter section 4d of the terminal equipment D, the delay time in the light transmission line leading from the output point of the electro-optic converter section 4d to the input of the opto-electric converter section 7a of the terminal equipment A and the delay time in the opto-electric converter section 7a and the receiver circuit 2a. In short, the one-cycle transmission delay time between the terminal equipments can be found by counting the time difference $T_D$ between the point of time when the master transmits a high-level signal with the passage of time $T_M$ after transmitting a bit synchronizing signal and the point of time when the master receives an acknowledge signal from the slave.

In the following. channel access control by the surviving type CSMA/CD is described. The terminal equipment to which a transmission request is given transmits a packet after confirming that a vacant channel exists. In the case where a plurality of terminal equipments try to transmit signals at a time, each terminal equipment transmits mode bits and master address bits synchronously with the terminal equipment which has transmitted the start bit at the first time. Each terminal equipment receives bits and compares the received bits with the bits which the terminal equipment has transmitted. When the result of comparison is discord, the terminal equipment stops signal transmission. The system is configured so that, in the case where a high-level bit and a low-level bit collide with each other, the result is made to be low-level, that is priority is given to the low-level bit. Accordingly, a terminal equipment which has transmitted the mode and master address bits containing the greatest number of low-level bits acquires channel access priority to serve as a master.

Figure 7:
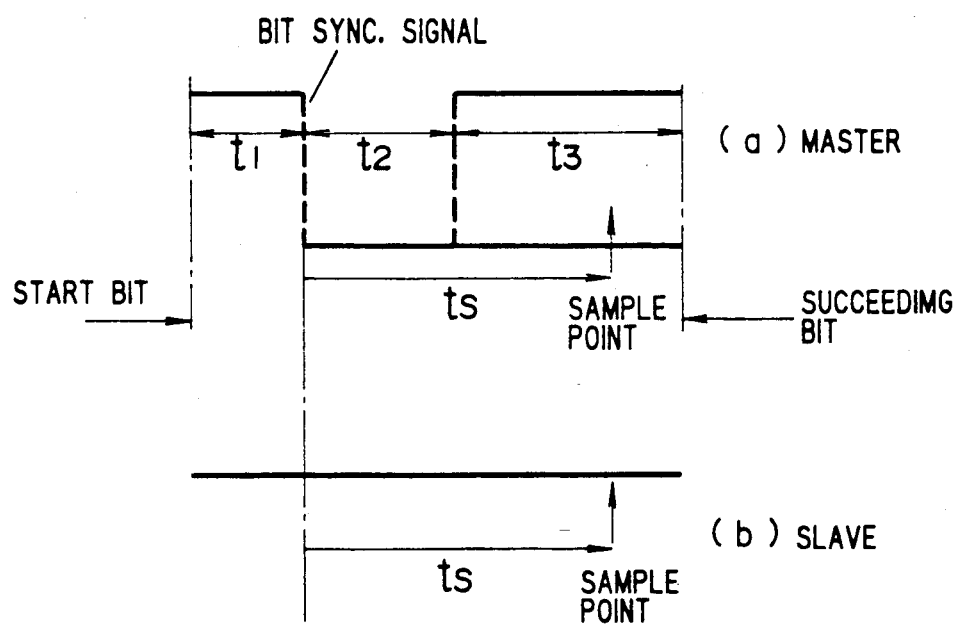
FIG. 7 is a diagram for explaining the bit format of a mode bit and a master address bit in a digital data bus.

The bit format of the mode and master address bits is shown in FIG. 7. In FIG. 7, the diagram (a) shows the bit format for a terminal equipment to which a transmission request is given and the diagram (b) shows the bit format for a terminal equipment to which no transmission request is given. A terminal equipment to which a transmission request is given transmits a bit data of high- or low-level signal for a time period $t_3$ with a passage of time $t_2$ after receiving the bit synchronizing signal which is transmitted with a passage of time $t_1$ after the start bit of the terminal equipment which has transmitted the start bit at the first time is terminated. Each terminal equipment A (B, ..., D) performs sampling of the output signal of the receiver circuit 2a (2b, ..., 2d) with a passage of time $t_S$ from the bit synchronizing signal. Under the consideration that the one-cycle transmission delay time $T_D$ is between terminal equipments, the bit data of the terminal equipment which has transmitted the bit synchronizing signal is not settled before the time $t_2 + T_D$ is passed after the bit synchronizing signal is transmitted. Accordingly, the time $t_S$ to the sampling point must satisfy the relation $t_S > t_2 + T_D$. In the case of $T_D = 0$, the bit data becomes unsettled again after the time $t_2 + t_3$. Accordingly, the sampling point must be established to satisfy the relation $t_2 + T_D < t_S < t_2 + t_3$ in which the range of the one-cycle delay time $T_D$ must satisfy the relation $0 \leq T_D < t_3$ to make it possible to sample settled data even in the case of $t_S \approx t_2 + t_3$. Generally, in the case where transmission rate is high, $t_3$ is small and high speed properties are required for the driver circuit 1a (1b, ..., 1d), the receiver circuit 2a (2b, ..., 2d), the electro-optic converter circuit 4a (4b, ..., 4d) and the opto-electric converter circuit 7a (7b, ..., 7d). In the configuration of the optical communication system according to the present invention, each terminal equipment A (B, ..., D) contains one driver circuit 1a (1b, ..., 1d), one receiver circuit 2a (2b, ..., 2d), one electro-optic converter circuit 4a (4b, ..., 4d) and one opto-electric converter circuit 7a (7b, ..., 7d) as shown in FIG. 3, so that the delay time is considered to be the same even in the case where a communication is made between arbitrary terminal equipments. When the delay time is represented by $T_{DT}$, the one-cycle transmission delay time $T_D$ can be represented by the sum of the delay time $T_{DT}$ and the delay time $T_{Do}$ in the optical transmission line. In short, the distribution of the one-cycle transmission delay time $T_D$ is represented by the relation $T_{DT} < T_D \leq T_{DT} + T_{Do}$, and the center of the distribution is $T_{DT} + T_{Do}/2$. Accordingly, settled data can be sampled regardless of the value of $T_{DT}$ if $T_{Do}$ is within the range of $T_{Do} \leq t_3$, and if the distribution of the one-cycle transmission delay time $T_D$ is counted by the counting means in accordance with the present invention to shift the sampling point $t_S$ by the result $\Delta t_S$ ($= T_{TD} + T_{Do}/2 - t_3/2$) obtained by subtracting the half ($= t_3/2$) of the bit length $t_3$ with settled data from the calculated center of the distribution ($= T_{DT} + T_{Do}/2$). In short, according to the present invention, settled data can be sampled regardless of the delay time caused by the driver circuit 1a (1b, ..., 1d), the receiver circuit 2a (2b, ..., 2d), the electro-optic converter circuit 4a (4b, ..., 4d) and the opto-electric converter circuit 7a (7b, ..., 7d) constituting the terminal equipment A (B, ..., D) if the delay time caused by the light transmission line is less than the bit length with settled data. Further, the system can be modified as follows, and system reliability can be improved by the modification. In the case where the delay time $T_{Do}$ caused by the light transmission line is counted to be more than the bit length $t_3$ with settled data, the system is designed to report the fact to terminal equipments having delay time $T_{Do}$ more than the bit length $t_3$ so that signal transmission stops and abnormality is reported to the user by any indication means.

Although the aforementioned embodiments have shown the case where the invention is applied to a digital data bus, the following description shows the case where the invention is applied to a system, such as a home bus system, in which an acknowledge byte is returned after one packet is received.

Figure 8:
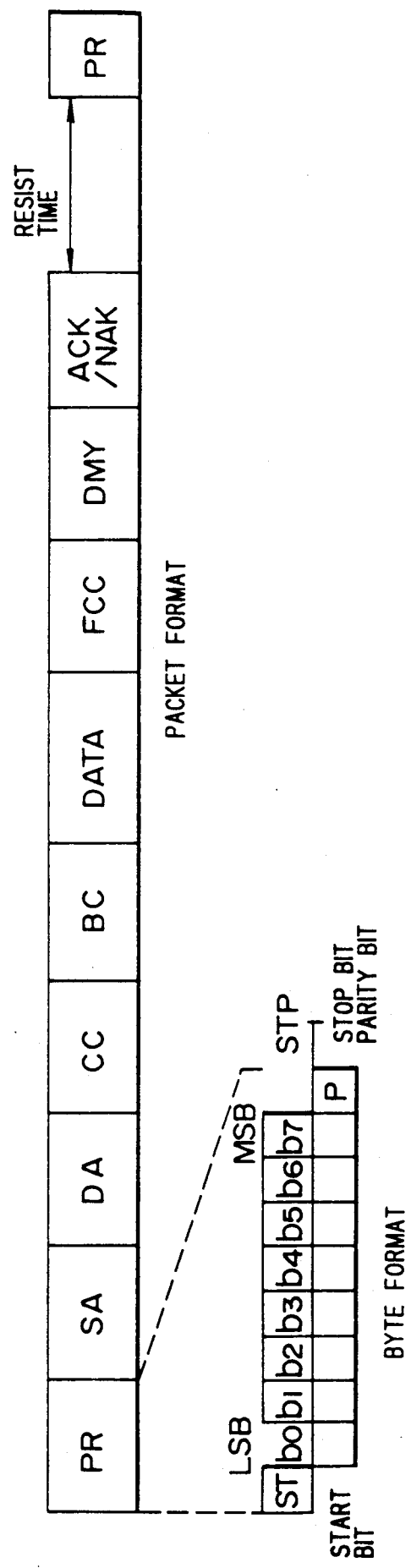
FIG. 8 is a diagram for explaining the packet format and the byte format in a home-bus system.

The packet format of the home bus system is shown in FIG. 8. In FIG. 8, the symbol PR in the format represents a priority code, SA a source address, DA a destination address, CC a control code, BC a telegram-length code, DATA data, FCC a check code, DMY a dummy, and ACK/NAK an acknowledge code. The home bus system employs start-stop synchronization in which synchronization is made based on the start bit and the stop bit contained in each byte as a constituent member of a packet. A terminal equipment designated by the destination address DA returns an acknowledge code with the passage of dummy time (time corresponding to 11 bits) after the terminal equipment receives the packet until the check code FCC. Accordingly, the one-cycle transmission delay time $T_D$ can be found by subtracting the time corresponding to 11 bits from the value obtained by counting the time difference between the point of time when transmission of the stop bit of the check code is terminated in the terminal equipment to transmit a packet and the point of time when reception of the start bit of the acknowledge code from the other terminal equipment is started. In the case of the home bus system, channel access control is made based on the respective bits of the priority code and the source address. In the case of start-stop synchronization as in the home bus system regardless of bit synchronization, it generally, sampling is made in the center of the bit with settled data. In the case where pulse duty ratio is 50%, sampling is made in the point of $\frac{1}{4}$ bit length of the respective bit. In the case where pulse duty ratio is 100%, sampling is made in the point of $\frac{1}{2}$ bit length of the respective bit. Accordingly, the limit of the one-cycle transmission delay time $T_D$ is $\frac{1}{4}$ bit time in the case where pulse duty ratio is 50%. The limit of the one-cycle transmission delay time $T_D$ is $\frac{1}{2}$ bit time in the case where pulse duty ratio is 100%. Accordingly, the scale of the system is limited more as transmission rate increases. According to the method of the invention, sampling timing can be shifted by the mean delay time in the distribution of the transmission delay time through founding the transmission delay time of each terminal equipment according to the method of the invention, so that the permissible range of the one-cycle transmission delay time can be greatly enlarged.

What is claimed is:

1. An optical communication system comprising a plurality of terminal equipments, each of said terminal equipments including: a communication interface section having a driver circuit for transmission of an electric signal and a receiver circuit for reception of an electric signal; and electro-optic converter section for modulating an output signal of said driver circuit and for converting it into an optical signal; an optical amplifier for amplifying an optical output signal of said electro-optic converter section with a suitable amplification factor based on a signal sent from said communication interface section to thereby make is possible to send the amplified onto a bus; and an opto-electric converter section for converting an optical signal received from said bus into an electric signal and for demodulating a frequency-modulated or phase-modulated signal so as to lead the demodulated signal to said receiver circuit; whereby communication between said terminal equipments is enabled to be performed through execution of: a first sequence in which each terminal equipment transmits a packet addressed to itself while increasing said amplification factor of said optical amplifier successively from a minimum value to recognize the lowest limit of said amplification factor to enable said terminal equipment to receive said packet at the time of the starting of said system; a second sequence in which each terminal equipment transmits a packet addressed to each of the other terminal equipments to inform each of the other terminal equipments of the value of the amplification factor recognized in said first sequence; and a third sequence in which each terminal equipment selects the largest one of the values of the amplification factor received by said terminal equipment in said second sequence so that each terminal equipment establishes the amplification factor of its optical amplifier to be the selected largest value.

2. A communication system comprising a plurality of terminal equipments interconnected through a communication channel and each having a communication interface section, a driver circuit for transmission of an electrical signal to said communication channel and a receiver circuit for reception of an electrical signal from said communication channel, wherein each of said terminal equipments further includes: a counting means for counting, upon transmission of a basic packet comprising a plurality of bytes or one byte, a time difference between the point of time when a signal is transmitted from said communication interface section to said driver circuit and the point of time when an acknowledge bit or byte or return bit reaches said interface section through said receiver circuit and for informing said interface section of the count result so as to cause said interface section to hold the result; and means for informing the other terminal equipments of abnormality when said count result is out of a permissible range of said time difference for performing channel access control based on CSMA/CD without difficulty, whereby a sequence for transmitting said packet successively to all of said terminal equipments is executed at the time of the starting of said system, and the abnormality information is reported to one or ones of said terminal equipments in which said count result of said time difference is out of said permissible range of said time difference for performing channel access control based on CSMA/CD without difficulty.

3. A communication system comprising a plurality of terminal equipments interconnected through a communication channel and each having a communication interface section, a driver circuit for transmission of an electrical signal to said communication channel and a receiver circuit for reception of an electrical signal from said communication channel, wherein each of said terminal equipments further includes a counting means for counting, upon transmission of a packet, a time difference between the point of time when a signal is transmitted from said communication interface section to said driver circuit and the point of time when an acknowledge bit or byte or return bit with respect to said packet reaches said interface section through said receiver circuit and for informing said interface section of the count result, whereby a sequence for transmitting said packet successively to all of said terminal equipments is executed at the time of the starting of said system, and a center value of distribution of delay time is calculated from said count result of said time difference so that sampling timing for sampling a reception signal sent from said receiver circuit is shifted by said center value of distribution of delay time.

* * * * *